United States Patent
Yun et al.

(10) Patent No.: US 7,079,545 B1
(45) Date of Patent: Jul. 18, 2006

(54) SYSTEM AND METHOD FOR SIMULTANEOUS DEFICIT ROUND ROBIN PRIORITIZATION

(75) Inventors: Kenneth Yi Yun, San Diego, CA (US); Kevin Warren James, San Diego, CA (US)

(73) Assignee: Applied Microcircuits Corporation (AMCC), San Diego, CA (US)

( * ) Notice: Subject to any disclaimer, the term of this patent is extended or adjusted under 35 U.S.C. 154(b) by 1020 days.

(21) Appl. No.: 10/022,673

(22) Filed: Dec. 17, 2001

(51) Int. Cl.
*H04L 12/56* (2006.01)

(52) U.S. Cl. ...................................... 370/412; 370/429
(58) Field of Classification Search ........ 370/412–418, 370/428, 429; 709/223–226
See application file for complete search history.

(56) References Cited

U.S. PATENT DOCUMENTS

| | | | | |
|---|---|---|---|---|
| 5,231,633 A * | 7/1993 | Hluchyj et al. | ............. | 370/429 |
| 5,889,779 A * | 3/1999 | Lincoln | ...................... | 370/398 |
| 6,044,061 A * | 3/2000 | Aybay et al. | ................ | 370/230 |
| 6,073,199 A | 6/2000 | Cohen et al. | ................ | 710/113 |
| 6,101,193 A | 8/2000 | Ohba | ......................... | 370/429 |
| 6,137,807 A * | 10/2000 | Rusu et al. | .................. | 370/429 |
| 6,275,491 B1 | 8/2001 | Prasad et al. | ................ | 370/389 |
| 6,285,679 B1 | 9/2001 | Dally et al. | .................. | 370/413 |
| 6,636,518 B1 * | 10/2003 | Liencres | ................... | 370/395.7 |
| 6,654,374 B1 * | 11/2003 | Fawaz et al. | ................ | 370/394 |
| 6,934,296 B1 * | 8/2005 | Shimojo | ..................... | 370/428 |
| 2002/0131413 A1 * | 9/2002 | Tsao et al. | ................... | 370/392 |
| 2003/0076848 A1 * | 4/2003 | Bremier-Barr et al. | ..... | 370/412 |

* cited by examiner

*Primary Examiner*—Ricky Q. Ngo
*Assistant Examiner*—Duc Duong (57) ABSTRACT

A system and method have been provided for prioritizing queued information packets having a variable number of cells. A simultaneous deficit round robin (DRR) analysis occurs in the course of several selection cycles. Each queue has an associated increment value. The packet lengths in each queue are simultaneously compared to an accumulation total in every selection cycle. If all the packets have lengths greater than their corresponding accumulation totals, each accumulation total is incremented and the selection process is repeated. If one of the information packets has a number of cells less than, or equal to its corresponding accumulation total, it is selected. In case multiple information packets are eligible, a variety of selection criteria can be used to break a tie. For example, the eligible information packet with the highest class of service (COS) can be selected. The information packet is completed transferred before another selection process is begun.

21 Claims, 10 Drawing Sheets

SYSTEM AND METHOD FOR SIMULTANEOUS DEFICIT ROUND ROBIN PRIORITIZATION

BACKGROUND OF THE INVENTION

1. Field of the Invention

This invention generally relates to prioritizing information for transfer across a switch interface and, more particularly, to a system and method for using a simultaneous deficit round robin (DRR) process of prioritizing the transfer of variable length information packets having different classes of service (COS).

2. Description of the Related Art

As noted in U.S. Pat. No. 6,285,679 (Dally et al.), data communication between computer systems for applications such as web browsing, electronic mail, file transfer, and electronic commerce is often performed using a family of protocols known as IP (internet protocol) or sometimes TCP/IP. As applications that use extensive data communication become more popular, the traffic demands on the backbone IP network are increasing exponentially. It is expected that IP routers with several hundred ports operating with aggregate bandwidth of Terabits per second will be needed over the next few years to sustain growth in backbone demand.

The network is made up of links and routers. In the network backbone, the links are usually fiber optic communication channels operating using the SONET (synchronous optical network) protocol. SONET links operate at a variety of data rates ranging from OC-3 (155 Mb/s) to OC-192 (9.9 Gb/s). These links, sometimes called trunks, move data from one point to another, often over considerable distances.

Routers connect a group of links together and perform two functions: forwarding and routing. A data packet arriving on one link of a router is forwarded by sending it out on a different link depending on its eventual destination and the state of the output links. To compute the output link for a given packet, the router participates in a routing protocol where all of the routers on the Internet exchange information about the connectivity of the network and compute routing tables based on this information.

Most prior art Internet routers are based on a common bus or a crossbar switch. In the bus-based switch of a SONET link, a line-interface module extracts the packets from the incoming SONET stream. For each incoming packet, the line interface reads the packet header, and using this information, determines the output port (or ports) to which the packet is to be forwarded. To forward the packet, the line interface module arbitrates for the common bus. When the bus is granted, the packet is transmitted over the bus to the output line interface module. The module subsequently transmits the packet on an outgoing SONET link to the next hop on the route to its destination.

Bus-based routers have limited bandwidth and scalability. The central bus becomes a bottleneck through which all traffic must flow. A very fast bus, for example, operates a 128-bit wide datapath at 50 MHz giving an aggregate bandwidth of 6.4 Gb/s, far short of the Terabits per second needed by a backbone switch. Also, the fan-out limitations of the bus interfaces limit the number of ports on a bus-based switch to typically no more than 32.

The bandwidth limitation of a bus may be overcome by using a crossbar switch. For N line interfaces, the switch contains N(N-1) crosspoints. Each line interface can select any of the other line interfaces as its input by connecting the two lines that meet at the appropriate crosspoint. To forward a packet with this organization, a line interface arbitrates for the required output line interface. When the request is granted, the appropriate crosspoint is closed and data is transmitted from the input module to the output module. Because the crossbar can simultaneously connect many inputs to many outputs, this organization provides many times the bandwidth of a bus-based switch.

Despite their increased bandwidth, crossbar-based routers still lack the scalability and bandwidth needed for an IP backbone router. The fan-out and fan-in required by the crossbar connection, where every input is connected to every output, limits the number of ports to typically no more than 32. This limited scalability also results in limited bandwidth. For example, a state-of-the-art crossbar might operate 32 different 32-bit channels simultaneously at 200 MHz giving a peak bandwidth of 200 Gb/s. This is still short of the bandwidth demanded by a backbone IP router.

Figure 1:
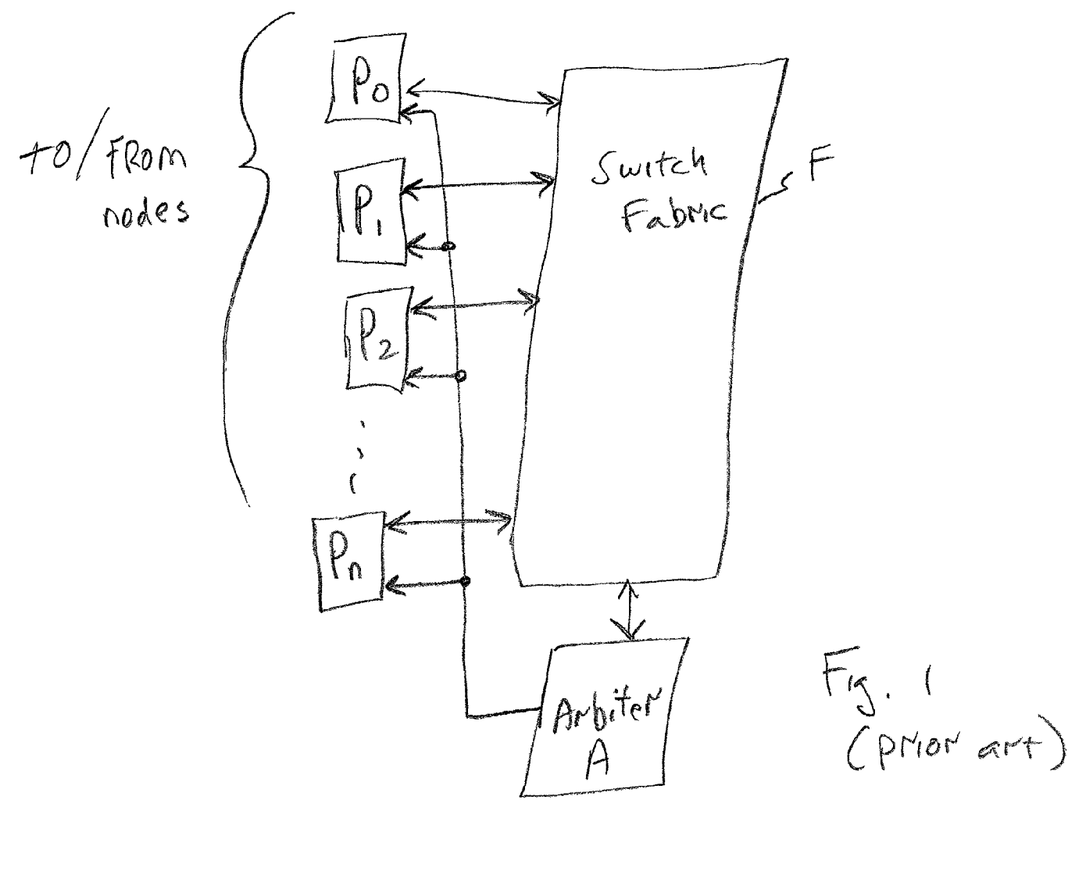
FIG. 1 is a schematic block diagram illustrating a conventional packet switch (prior art).

FIG. 1 is a schematic block diagram illustrating a conventional packet switch (prior art). As noted in U.S. Pat. No. 6,275,491 (Prasad et al.), the architecture of conventional fast packet switches may be considered, at a high level, as a number of inter-communicating processing blocks. In this switch, ports $P_O$ through $P_n$ are in communication with various nodes, which may be computers or other switches (not shown). Each of ports may receive data over an incoming link, and transmits data over an outgoing link. Each of ports are coupled to switch fabric F, which effects the routing of a message from the one of input ports, to the one of n output ports associated with the downstream node on the path to the destination of the packet. The switch has sufficient capability to divide the packet into slices (when on the input end) and to reconstruct slices into a packet (when on the output end). Arbiter A is provided to control the queuing of packets into and out of switch fabric F, and to control the routing operation of switch fabric F accordingly.

While the high-level architecture of fast packet switches may be substantially common, different architectural approaches are used in the implementation of the fast packet switch. These approaches determine the location (input, output, or both) and depth of cell queues or buffers, and also the type of routing used within switch fabric. For example, one architecture may operate by the input ports forwarding each received cell immediately to switch fabric F, which transfers cells at its input interfaces to its output interfaces in a time-division multiplexed fashion; on the output side, each cell that is output from switch fabric F is appended to a FIFO queue at its addressed output port. Another architecture may utilize input queues at the input ports, with arbiter A controlling the order in which cells are applied from the input queues to switch fabric F, which operates in a crossbar mode. Another architecture may utilize both input and output queues at the input ports, with switch fabric F and arbiter A operating as a multistage interconnection network. These and other various architectures are known in the field of fast packet switching.

Also as is well known in the art, actual communication traffic is neither uniform nor independent; instead, real traffic is relatively bursty, particularly in the communication of data and compressed video. As such, traffic management algorithms are often utilized in fast packet switching to manage the operation of the switch and to optimize switch performance. Examples of well-known traffic management algorithms include traffic shaping, flow control, and scheduling.

As noted in U.S. Pat. No. 6,073,199 (Cohen et al.), arbiters are used in computer systems to control access to a common bus used by multiple devices. Arbiters typically use arbitration schemes such as fixed priority, round robin, or rotating priority. A fixed priority algorithm assigns a priority to each device on the bus and grants usage based upon the relative priority of the devices making the requests. The round robin scheme has a fixed order and grants bus usage based upon the requestor order and the current user of the bus. The rotating priority scheme changes the priority of requestors based on a fixed algorithm.

The goal of all arbitration schemes is to insure fair access to the shared resource, and to efficiently grant the resource to the correct requestor. The fixed priority scheme is unfair because a high priority requestor can consume all the shared resource, starving the lower priority requestors. The round robin scheme is inefficient because multiple clocks may be required to determine which requestor should be granted the resource. Also round robin schemes have a fixed grant pattern that can result in starvation of particular requestors if request patterns match the round robin grant pattern. Rotating priority schemes are random in their efficiency and fairness based on the algorithm chosen to update device priority.

As noted in U.S. Pat. No. 6,101,193 (Ohba), deficit round robin (DRR) uses packet queues provided in correspondence to flows in conjunction with an active list which holds flow IDs of (active) packet queues in which packets are currently queued and a counter which indicates a number of bytes that are currently transmittable by each flow.

Namely, in the DRR, for each flow from which a next packet could not have been outputted because a packet length of that next packet was greater than the counter value in the previous round, a number of bytes that were allowed to be outputted but not actually outputted in the previous round will be added to the counter value for the next round so that a number of bytes more than the weight can be outputted in the next round.

According to this DRR, a time required for the packet output unit to select the next output packet becomes constant regardless of the number of flows. In addition, it is possible to guarantee the maximum value of the delay when the flow input traffic obeys the reported traffic parameter, as well as the fairness in a time scale longer than one round. However, in the DRR, once the flow is selected, it will continue to select packets from the same flow until it becomes no longer possible to decrement the counter or the packet queue becomes empty, so that the burstiness for each flow becomes large in a time period shorter than one round, and the fairness characteristic will be degraded. This tendency becomes more prominent when the maximum packet length becomes longer, that is, when the minimum value of the weight becomes larger.

Thus the DRR, which is one example of the conventional weighted fair queuing algorithms, is associated with the problem that the fairness characteristic is degraded because the burstiness for each flow becomes large in a time period shorter than one round.

It would be advantageous if a scheduling algorithm could be devised for the efficient transfer of information packets having a variable length, or variable number of cells.

It would be advantageous if variable length information packets could be scheduled for transfer across a switch with a minimum of overhead devoted to the scheduling decision process.

It would be advantageous if a scheduling algorithm could be applied to switch scheduling that was both fair and efficient.

It would be advantageous if the DRR scheduling algorithm could be implemented in switch scheduling with a minimum of sequential processing.

It would be advantageous if information packet DRR priority decisions could be made simultaneously.

SUMMARY OF THE INVENTION

The round robin scheduling algorithm, while essentially fair, cannot take into account information packets differentiated with respect to a QoS or class of service (COS). Further, the round robin algorithm is inefficient. The deficit round robin (DRR) combines the fairness of the round robin algorithm with the consideration of COS. Conventionally, the DRR analysis requires a sequence of steps (clocks). Each COS queue must be examined. The present invention DRR algorithm is able to analyze each COS queue simultaneously.

Accordingly, a method is provided for prioritizing information packets for transfer across a switch. The method comprises: accepting a plurality of variable length information packets at each switch input, where each information packet has an associated class of service (COS); organizing the information packets into a plurality of queues based upon COS; simultaneously performing a DRR analysis of the information packets at the head of each queue; and, selecting an information packet for transfer in response to the simultaneous analysis.

The method further comprises: establishing a plurality of selection cycles per decision cycle. Then, the information packets at the head of each queue are analyzed every selection cycle, in response to the number of cells in each information packet.

The method selects an increment value for each of the plurality of COS queues corresponding to a selected number of cells. Higher ranked COS queues can receive increment values with larger numbers of cells. More specifically, the number of cells in the information packet at the head of the queue is compared to the corresponding total accumulation in a plurality of selection cycles.

For each COS queue, a bank is established for banking increment values. For each selection cycle, the number of cells in the information packet at the head of each COS queue is compared to a total accumulation that includes the increment value, plus the banked accumulation. If the information packets have a number of cells less than, or equal to the total accumulation, the information packet eligible is eligible for selection. If information packets are eligible from a plurality of queues, the information packet in the queue having the highest COS is picked. The method provides alternate selection criteria, besides from the highest COS.

Additional details of the above-mentioned simultaneous DRR prioritization method, as well as a system for prioritizing the transfer of information packets, are presented below.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a device. These descriptions and representations are the means used by those skilled in the data processing arts to most effectively convey the substance of their work to others skilled in the art. A procedure, microprocessor executed step, data item, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a switch. It has proven convenient at times, principally for reasons of common usage, to refer to these signals as bits, values, elements, symbols, characters, terms, data items, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution. Further, a software application can run switching and arbitrating functions.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "determining" or "comparing" or "replacing" or "addressing" or "retrieving" or the like, refer to the action and operations of in a system that manipulates and transforms data represented as physical (electronic) quantities within the computer system's registers and memories into other data similarly represented as physical quantities within the switch, or switch peripherals.

Figure 2A:
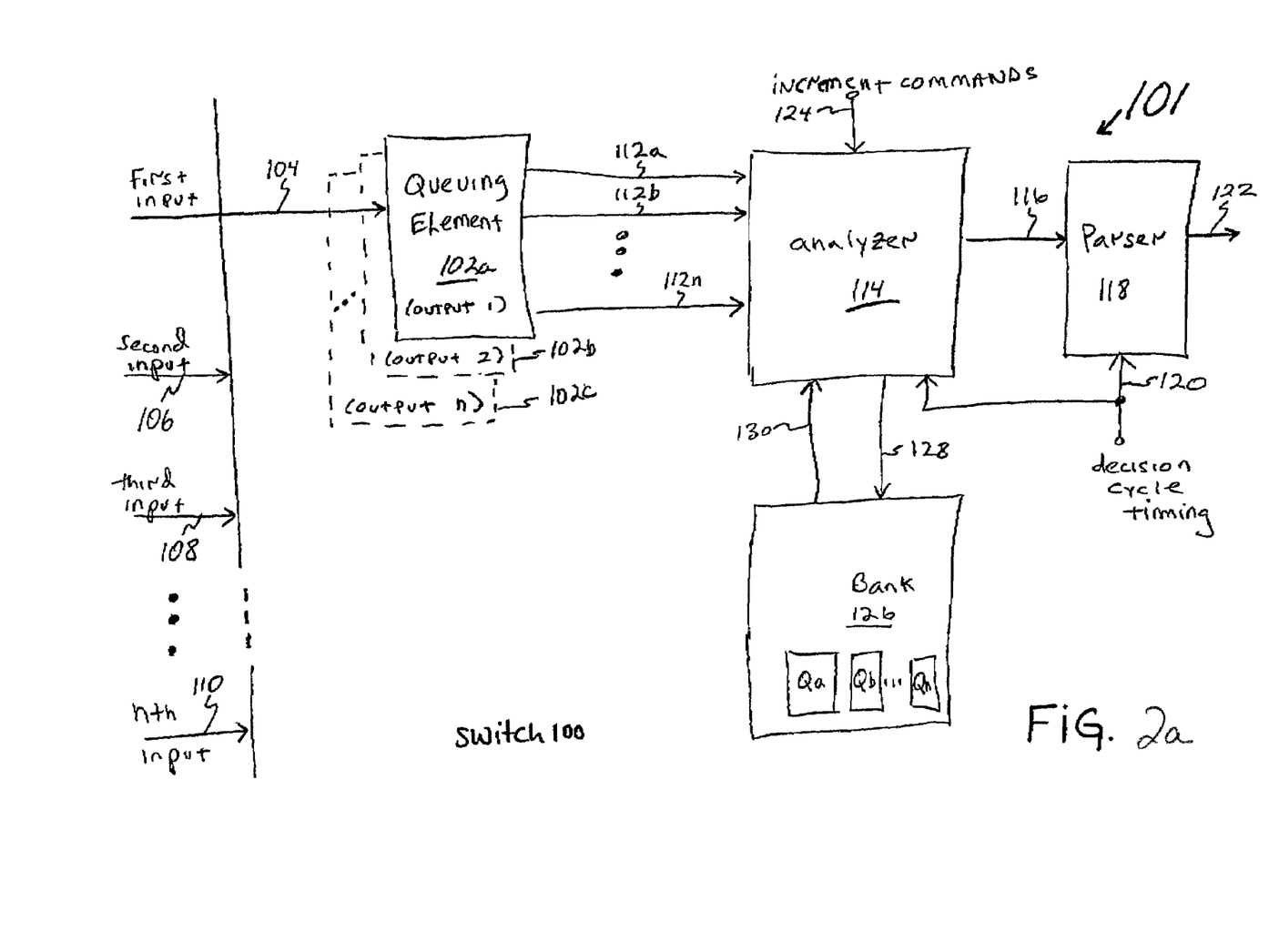
FIGS. 2a and 2b are schematic block diagrams of a switch including the present invention system for prioritizing the transfer of information packets.
Figure 2B:
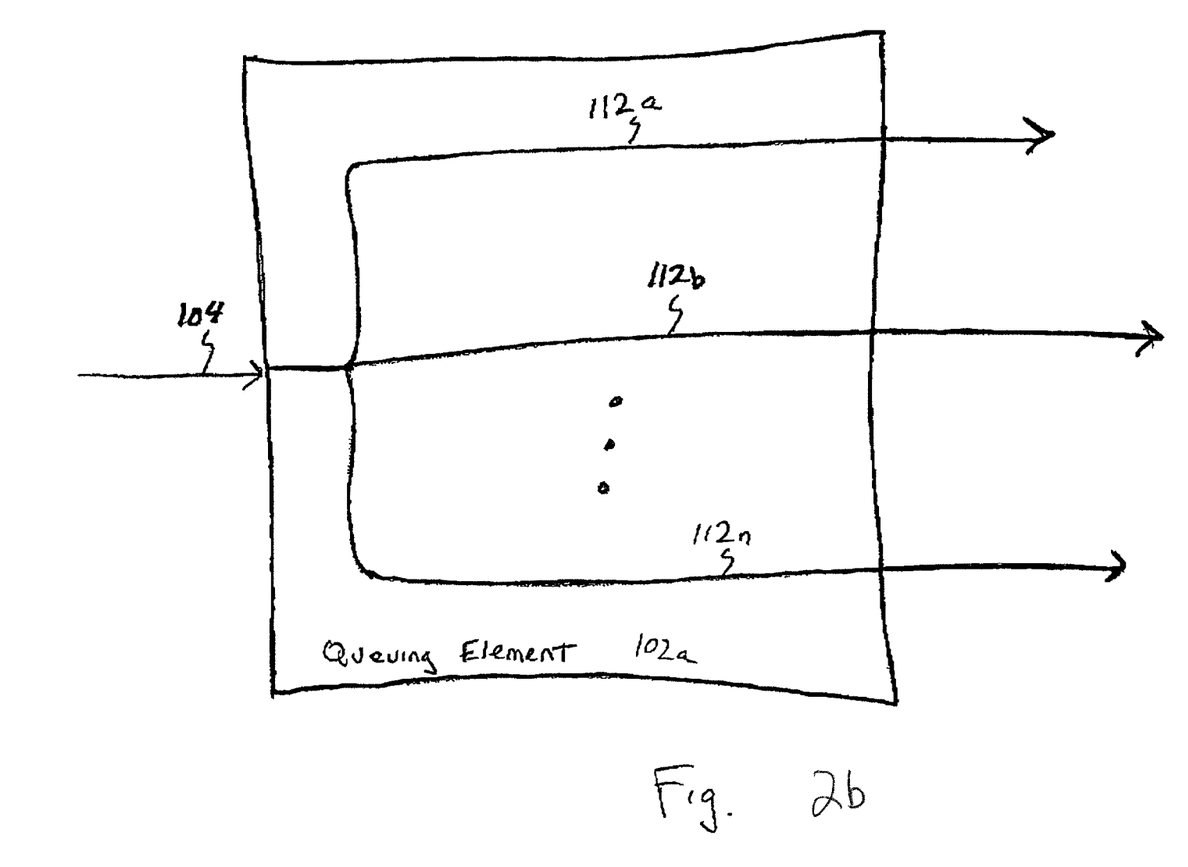

FIGS. 2a and 2b are schematic block diagrams of a switch including the present invention system for prioritizing the transfer of information packets. Such a system might be used in a switch to minimize head-of-line blocking. Each information packet includes a variable number of cells, where a cell is defined as a predetermined number of bytes. Alternately stated, each information packet has a variable length. The invention is not limited to any particular number of bytes per cell, or cells per information packet. However, cell sizes of 53, 64, and 80 bytes are typical. In FIG. 2a, the switch 100 includes a prioritization system 101. The system 101 comprises a queuing element 102a with an input on line 104 to accept a plurality of variable length information packets. The switch 100 typically includes a plurality of inputs. A second input on line 106, a third input on line 108, and an nth input on line 110 are shown. Although the following discussion is limited to the first input, equivalent elements and process exist in the system 101 for each switch input. That is, although a single queuing element 102a is depicted and described below, each switch input (106, 108, and 110) is connected to a corresponding equivalent queuing element, not shown.

It should also be noted that queuing element 102a is associated with information packets that address a specific switch output. For example, a first switch output addressed from among a plurality of switch outputs. The switch outputs (not shown) are connected to the switch inputs through at least one crossbar (not shown). Ultimately, the switch outputs are connected to the information packet destinations. Information packets arrive at the first switch input, each information packet addressed to one of a plurality of switch outputs. A separate queuing element (and associated elements, presented below) is required for each switch output. Thus, queuing element 102a accepts information packets addressed to the first switch output. Queuing elements 102b and 102c, in dotted lines, accept information packets addressed to a second switch output and an nth switch output, respectively.

FIG. 2b is a schematic block diagram illustrating the queuing element 102a of FIG. 2a in greater detail. The queuing element 102a has outputs on lines 112a, 112b, through 112n, to supply the information packets organized into a plurality of corresponding queues (queue a, queue b, through queue n). For simplicity, the combination of queue outputs is sometimes referred to herein as line 112. In some aspects of the invention, the queuing element 102a accepts information packets having a ranked class of service (COS), and it differentiates between the plurality of queue outputs on line 112 by information packet COS. That is, queue a (line 112a) has a first COS, and queue b (line 112b) has a second COS with a different hierarchical rank than the first COS. In some aspects of the system 101, the differentiation is based upon other characteristics associated with the information packets.

Returning to FIG. 2a, an analyzer 114 has an input connected to the queuing element 102a output on line 112. The analyzer 114 simultaneously performs a deficit round robin analysis the information packets at the head of each queue and selects an information packet for transfer, in response to the simultaneous analysis of the queues. The term deficit round robin is intended to have the meaning understood by one skilled in this art. However, the simultaneous aspect of the DRR analysis is not conventional, and details of the present invention DRR process are provided in more detail below. The selected information packet is supplied at an output on line 116.

A parser 118 has an input connected to the output of the analyzer 114 on line 116. The parser 118 processes the selected information packet in units of one cell (of n bytes). The information packets are already parsed into cell units. The parser processes the information packets between the switch and the queuing elements in unit of a cell. The parser 118 has a second input on line 120 to accept a decision cycle signal including a plurality of selection cycles. The parser has an output on line 122 to transfer one cell from the selected information packet every decision cycle. Once an information packet is selected by analyzer 114, the parser 118 transfers one cell every decision cycle, in this case to the first switch output, until no further cells remain in the selected information packet. Then, after completing the transfer, the analyzer 114 selects a new information packet. That is, when the parser 118 completes the transfer of a selected information packet in a first decision cycle, the analyzer 114 simultaneously performs a deficit round robin reanalysis of the information packets at the head of each COS queue in a decision cycle, subsequent to the first decision cycle.

The present invention system 101 functions to evenly distribute the selection of queues, more evenly than a simple selection process based merely upon COS. To accomplish this distribution, each decision cycle is differentiated into a plurality of selection cycles. The analyzer 114 has a second input on line 120 to receive the decision cycle signal including a plurality of selection cycles, essentially a clock signal with finer gradation clock signals. The analyzer 114 simultaneously performs a DRR analysis of the information packet at the head of each queue in each selection cycle. Further, the analysis is typically responsive to the number of cells in each information packet.

The analyzer 114 has a third input on line 124 to accept increment value selection commands for each of the plurality of queues. An increment value is defined herein as a predetermined number of cells that can be selected. Generally, the analyzer 114 accepts commands that select increment values with larger numbers of cells for higher ranking COS queues, although this is not always the case. As is explained in more detail below, the larger increment value predisposes the selection of higher ranking COS queues.

Broadly, the analyzer 114 selects an information packet for transfer by comparing the number of cells in the information packet at the head of the queue to its corresponding increment value. For a selection to occur, the analyzer 114 typically compares the number of cells in the information packet at the head of the queue to the corresponding total accumulation in a plurality of selection cycles.

The system 100 further comprises a bank 126 having an input on line 128 to accept and add increment values. The increment values are added to a banked accumulation for each queue, depicted as Qa, Qb, through Qn. Unless a queue is selected, the increment values are banked every selection cycle. The bank 126 has an output on line 130 to supply a total accumulation for each queue. The total accumulation equals the banked accumulation plus the latest increment value.

Figure 3:
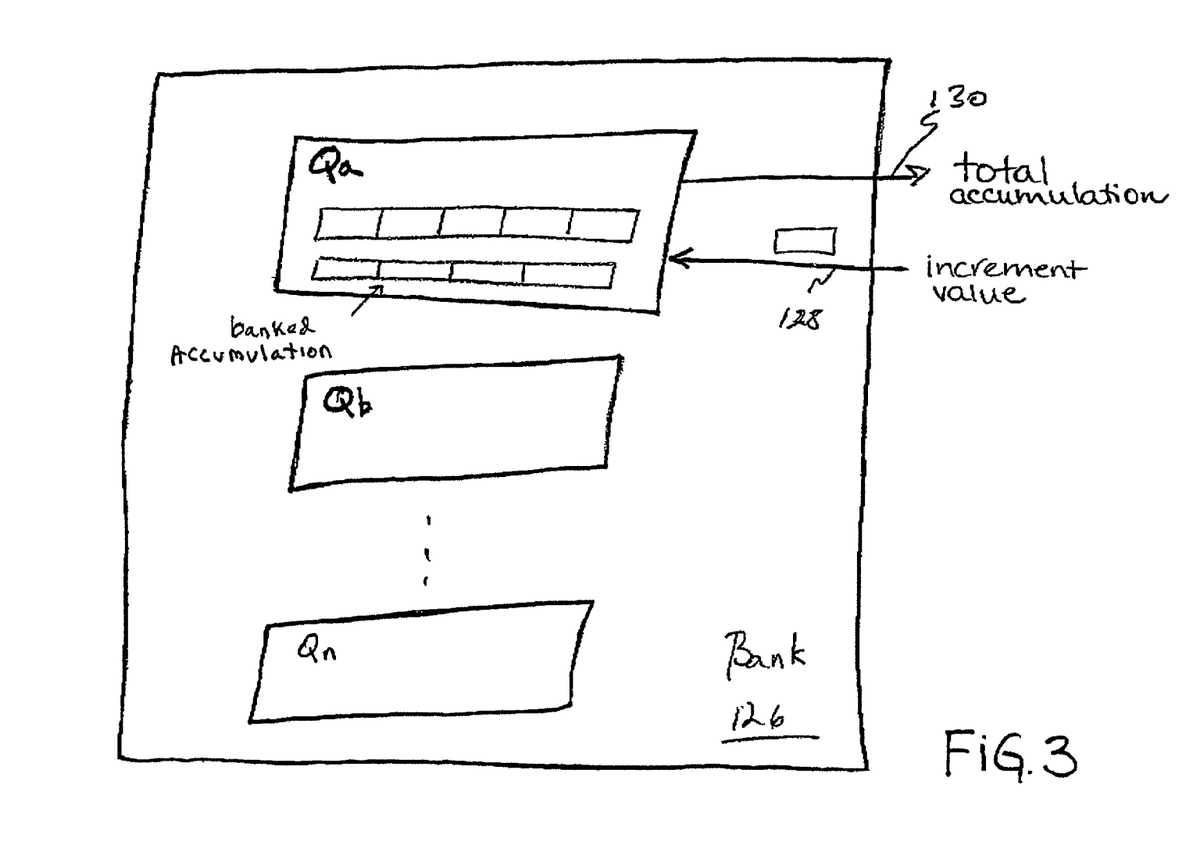
FIG. 3 is a schematic block diagram illustrating the bank of FIG. 2a in greater detail.

FIG. 3 is a schematic block diagram illustrating the bank 126 of FIG. 2a in greater detail. Bank Qa is shown having banked accumulation equal to approximately nine increment values. In every selection cycle the increment value on line 128 is added to the banked accumulation in Qa and presented as the total accumulation on line 130.

Returning to FIG. 2a, the analyzer 114 has a second output connected to the bank input on line 128 to supply increment values, and a third input connected to the bank output on line 130 to accept the total accumulation values. The analyzer 114 compares the number of cells in the information packets at the head of each queue to the respective total accumulation for each queue.

The analyzer 114 makes information packets eligible for selection if the information packets have a number of cells less than, or equal to the total accumulation. In one aspect of the invention, the analyzer 114 picks the information packet in the queue having the highest COS, if information packets are eligible from a plurality of queues. This selection method is defined herein as the highest COS method. Alternately, the analyzer 114 maintains an ordered list of queue succession (i.e., queue 3, follows queue 2, which follows queue 1), and in the event that multiple queues are available, the analyzer selects the least recently used available queue. If the least recently used queue is not available, the next available queue is picked following the order of succession from the least recently used queue. This selection criteria is defined herein as least recently used (LRU) method. In a third embodiment, the analyzer 114 maintains a list of queues ordered in response to their last use. The most recently used queue goes to the bottom of the list. In the event of multiple queues being available, the analyzer 114 selects the available queue highest on the list. The selection method is defined herein as the event succession method.

The bank 126 saves the total accumulation in each queue after each selection cycle (unless an information packet is selected). The analyzer 114 selects an information packet in a subsequent selection cycle by comparing the number of cells in the information packets at the head of each queue, to the total accumulation in each queue. An exception occurs to this banking rule when a queue is selected. Even then, the total accumulations from the non-selected queues are always banked at the end of the selection cycle.

Figure 4A:
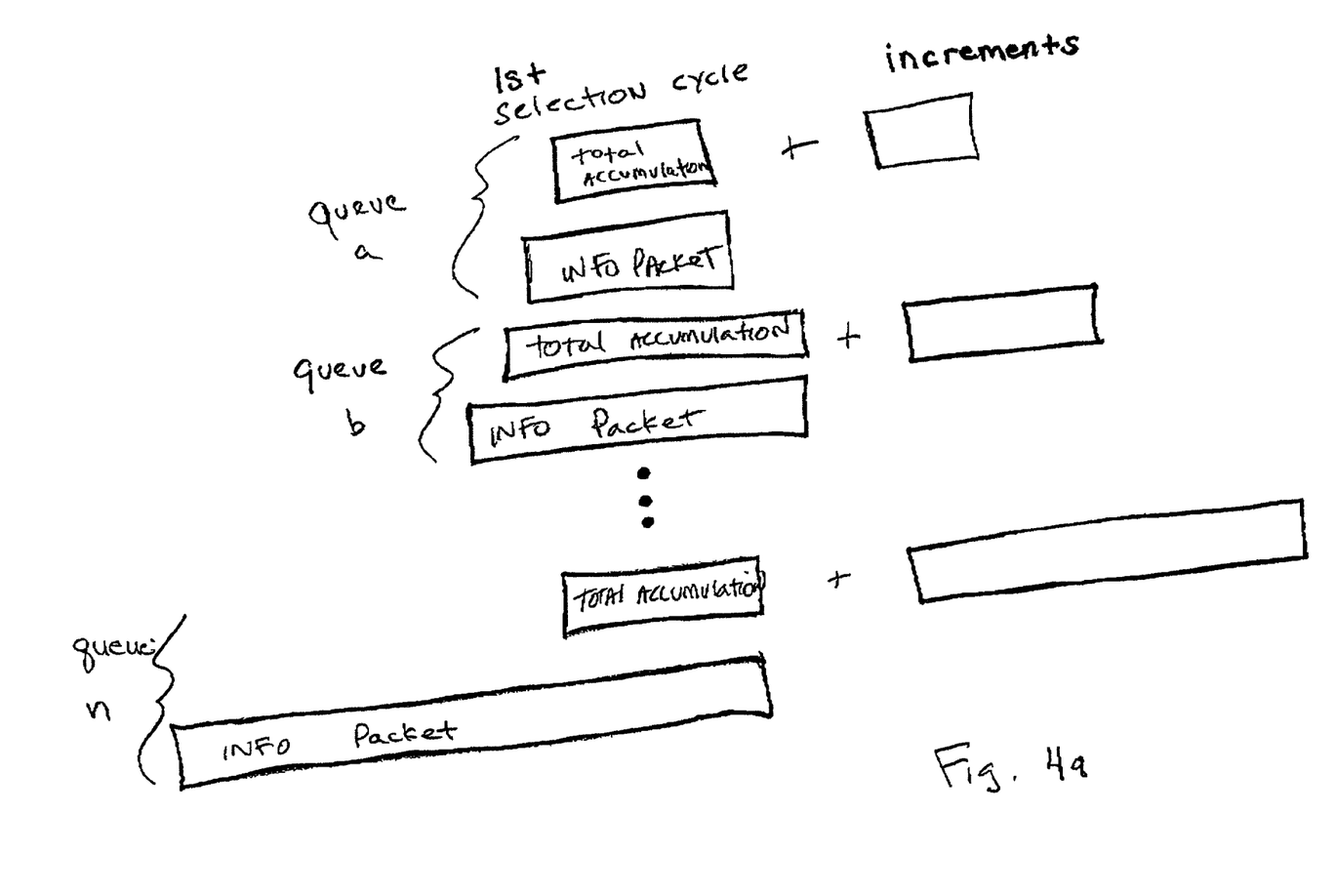
FIGS. 4a and 4b illustrate an example of the queue selection process performed by analyzer.
Figure 4B:
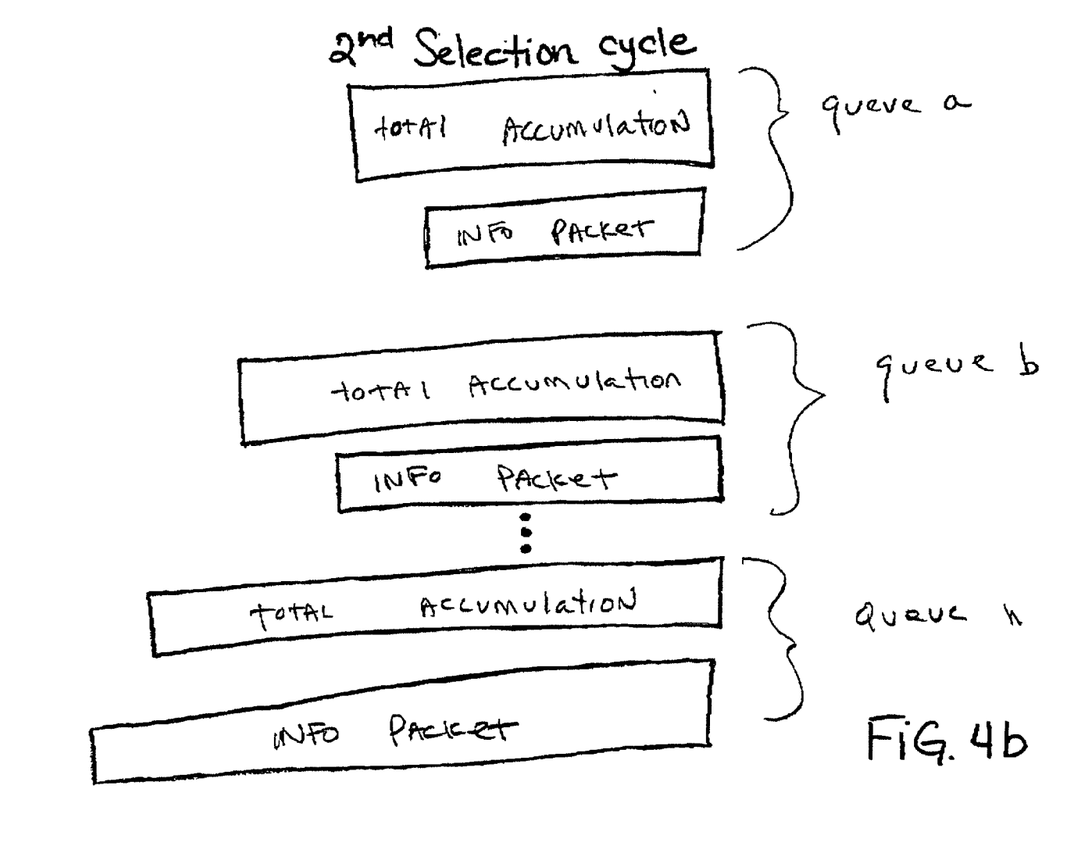

FIGS. 4a and 4b illustrate an example of the queue selection process performed by analyzer 114. In FIG. 4a, the analyzer 114 compares the total accumulation of each queue, to the number of cells in the information packet at the head of each queue, in a first selection cycle. The number of cells in each information packet (here depicted as the length of the information packet) exceeds the corresponding total accumulation in each queue. Therefore, no queue is selected. It is an aspect of the invention that the analysis performed in each selection cycle is substantially simultaneous. Each queue also has a corresponding increment value. Typically, higher COS queues have larger (depicted as longer) increment values, making information packets in that queue more likely to be selected.

After the first selection cycle, the total accumulation is banked, and becomes the banked accumulation. In the second selection cycle the increment is added to the banked accumulation to form a new total accumulation. FIG. 4b illustrates the comparison process in the second selection cycle. As can be seen, the total accumulation in both queues a and b exceeds the length (number of cells) of their corresponding information packet cells. Therefore, the information packets in both these queues are eligible for selection. The tie is broken by using the highest COS, least recently used, or event succession methods described above. Using the highest COS method and assuming the COS of queue b is higher than queue a (this assumption is reasonable since the increment value is longer), queue b is selected in this example. Note that the present invention is not limited to any particular number of queues or selection cycles.

In some aspects of the invention, it is desirable that the analyzer 114 make a selection within a maximum number of selection cycles. That is, the decision cycle signal is defined to include a maximum number of selection cycles. To accomplish this, the queuing element 102a accepts information packets having a maximum number of cells. The analyzer 114 receives commands to select a (at least one) minimum increment value with a minimum number of cells. Then, the analyzer 114 simultaneously performs a DRR analysis of information packets so that the maximum number of selection cycles, times the minimum increment value is greater than, or equal to the maximum number of cells in the information packet. In this manner, the analyzer 114 is guaranteed to select at least one queue every decision cycle.

Since the selected information packet is typically more than a cell in length, several decision cycles are required for transfer to the switch output. During the transfer it is unnecessary for the analyzer 114 to select information packets. Following the transfer of the selected information packet by the parser 118, the bank 126 accepts a withdrawal from the banked accumulation of the selected queue. The withdrawal equals the number of cells in the transferred information packet. The remaining accumulation becomes the new banked accumulation for the first selection cycle in the next decision cycle. The queuing element 102a accepts a new information packet at the head of the selected queue, and the analyzer 114 simultaneously performs a DRR reanalysis of the information packets at the head of each queue in the next decision cycle.

Figure 5:
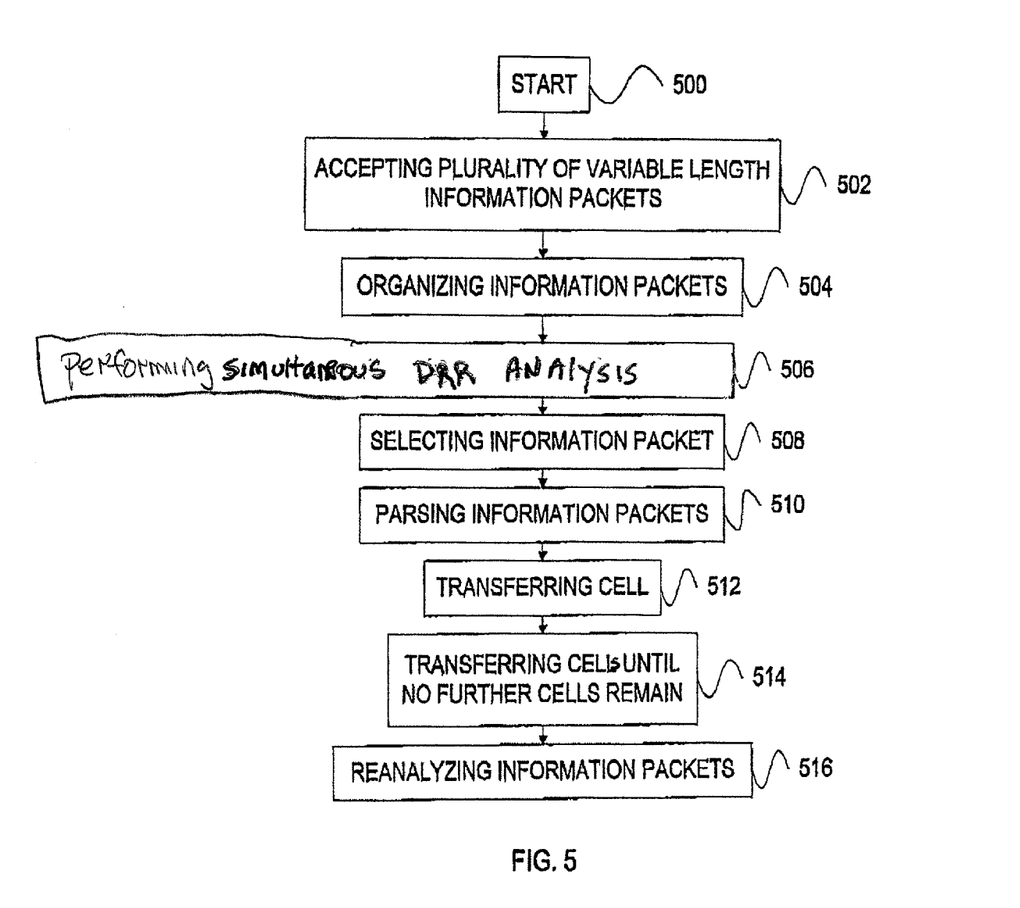
FIG. 5 is a flowchart illustrating a method for prioritizing information packets for transfer across a switch.

FIG. 5 is a flowchart illustrating a method for prioritizing information packets for transfer across a switch. The method begins with Step 500. Step 502 accepts a plurality of variable length information packets at each switch input. Step 504 organizes the information packets into a plurality of queues. Step 506 simultaneously performs a DRR analysis of the information packets at the head of each queue. Step 508 selects an information packet for transfer in response to the simultaneous analysis.

In some aspects of the invention, accepting a plurality of information packets in Step 502 includes accepting information packets having a ranked class of service (COS). Organizing the information packets into a plurality of queues in Step 504 includes differentiating the queues by the COS of each information packet.

Step 510 parses the information packets into lengths of one cell. Step 512 transfers one cell from the selected information packets every decision cycle. Step 514 transfers one cell every decision cycle until no further cells remain in the selected information packet. Step 516 simultaneously performs a DRR reanalysis of the information packet at the head of each queue after completing the transfer of the information packet cells.

Figure 6:
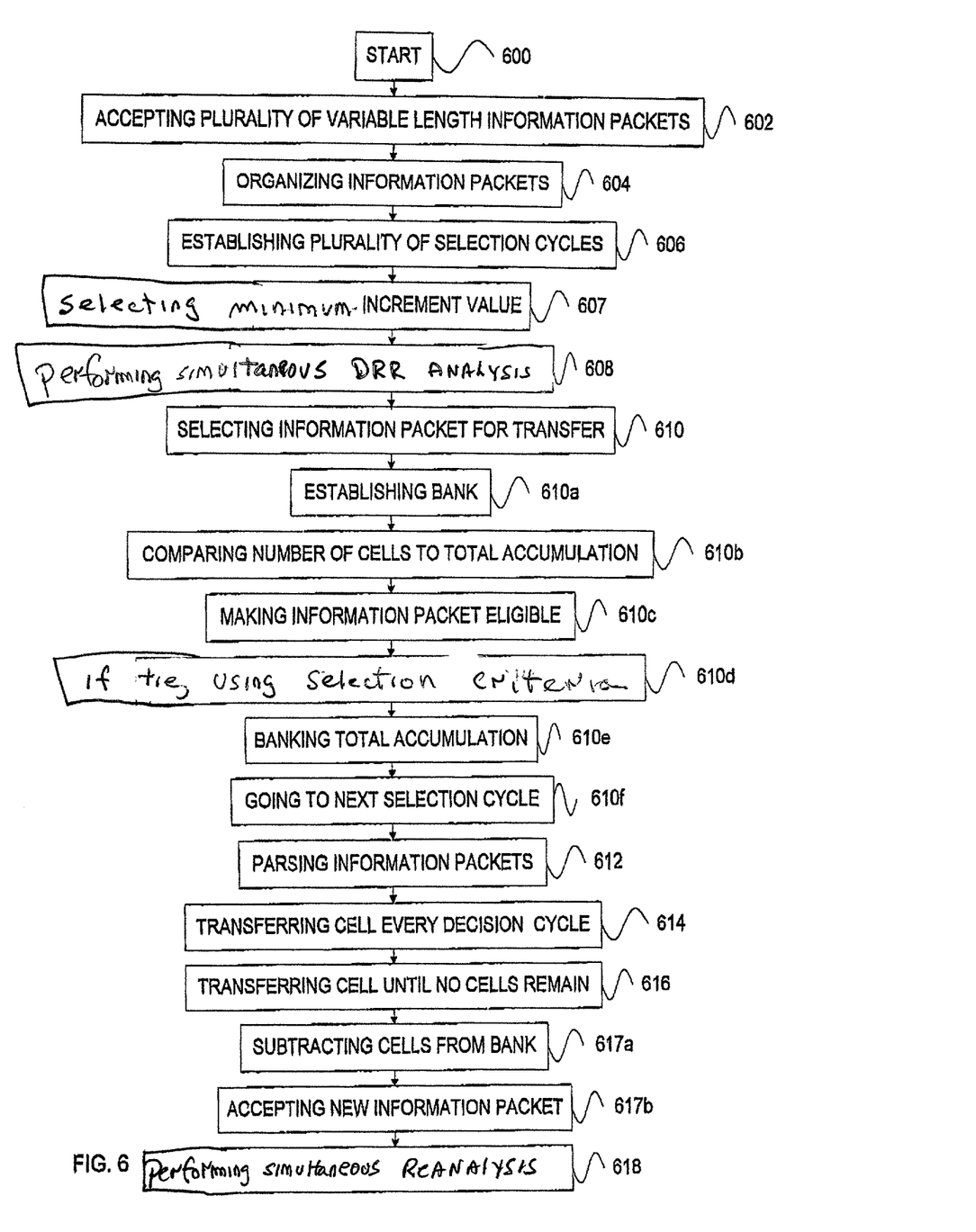
FIG. 6 is a flowchart illustrating additional details of the method of FIG. 5.

FIG. 6 is a flowchart illustrating additional details of the method of FIG. 5. The method begins with Step 600. Step 602 accepts a plurality of variable length information packets having a ranked class of service (COS) at each switch input. Step 604 organizes the information packets into a plurality of queues differentiated by the COS of each information packet. Step 606 establishes a plurality of selection cycles per decision cycle. Step 608 simultaneously performs a DRR analysis of the information packet at the head of each queue in a plurality of selection cycles per decision cycle. Step 610 selects an information packet for transfer in response to the simultaneous analysis. Step 612 parses the information packets into lengths of one cell. Step 614 transfers one cell from the selected information packet every decision cycle. Step 616 transfers one cell every decision cycle until no further cells remain in the selected information packet. After Step 616, Step 618 simultaneously performs a DRR reanalysis of the information packets at the head of each COS queue.

In some aspects of the invention, simultaneously performing the DRR analysis of the information packets at the head of each queue in Step 608 includes analyzing information packets in response to the number of cells in each information packet.

Step 607 selects an increment value for each of the plurality of queues, where each increment value corresponds to a selected number of cells. Selecting an information packet for transfer in response to the simultaneous analysis in Step 610 includes comparing the number of cells in the information packet at the head of the queue to its corresponding increment value. In some aspects of the invention, selecting an increment value for each of the plurality of queues in Step 607 includes selecting increment values with larger numbers of cells for higher ranking COS queues.

Selecting an information packet for transfer in response to the simultaneous analysis in Step 610 typically includes comparing the number of cells in the information packet at the head of the queue to a corresponding total accumulation of increment values, accumulated in a plurality of selection cycles.

In some aspects, selecting an information packet for transfer in response to the simultaneous analysis in Step 610 includes sub-steps. Step 610a establishes a bank for banking increment values for each queue. Step 610b, for each selection cycle, compares the number of cells in the information packets at the head of each queue to a total accumulation, where the total accumulation includes the increment value, plus previously banked increment values. Step 610c makes the information packet eligible for selection if the information packets have a number of cells less than, or equal to the total accumulation. Step 610d selects the information packet in the queue having the highest COS if information packets are eligible for selection from a plurality of queues. Alternately, the least recently used or event succession methods are used. Step 610e banks the total accumulation in each queue if no information packets are selected. Step 610f goes to the next selection cycle.

In some aspects of the invention, accepting a plurality of information packets in Step 602 includes accepting information packets having a maximum number of cells. Selecting increment values in Step 607 includes selecting a minimum increment value with a minimum number of cells. Simultaneously performing a DRR analysis of the information packets at the head of each queue in Step 608 includes simultaneously analyzing information packets in a maximum number of selection cycles every decision cycle, where the maximum number of selection cycles, times the minimum increment value is greater than, or equal to the maximum number of cells in an information packet.

Step 617a, following the transfer of the selected information packet, subtracts the number of cells in the transferred information packet from the bank of the queue from which the information packet was selected. Step 617b accepts a new information packet at the head of the queue from which the information packet was selected. Simultaneously performing a DRR reanalysis of the information packets at the head of each queue in Step 618 includes analyzing the new information packet.

Figure 7A:
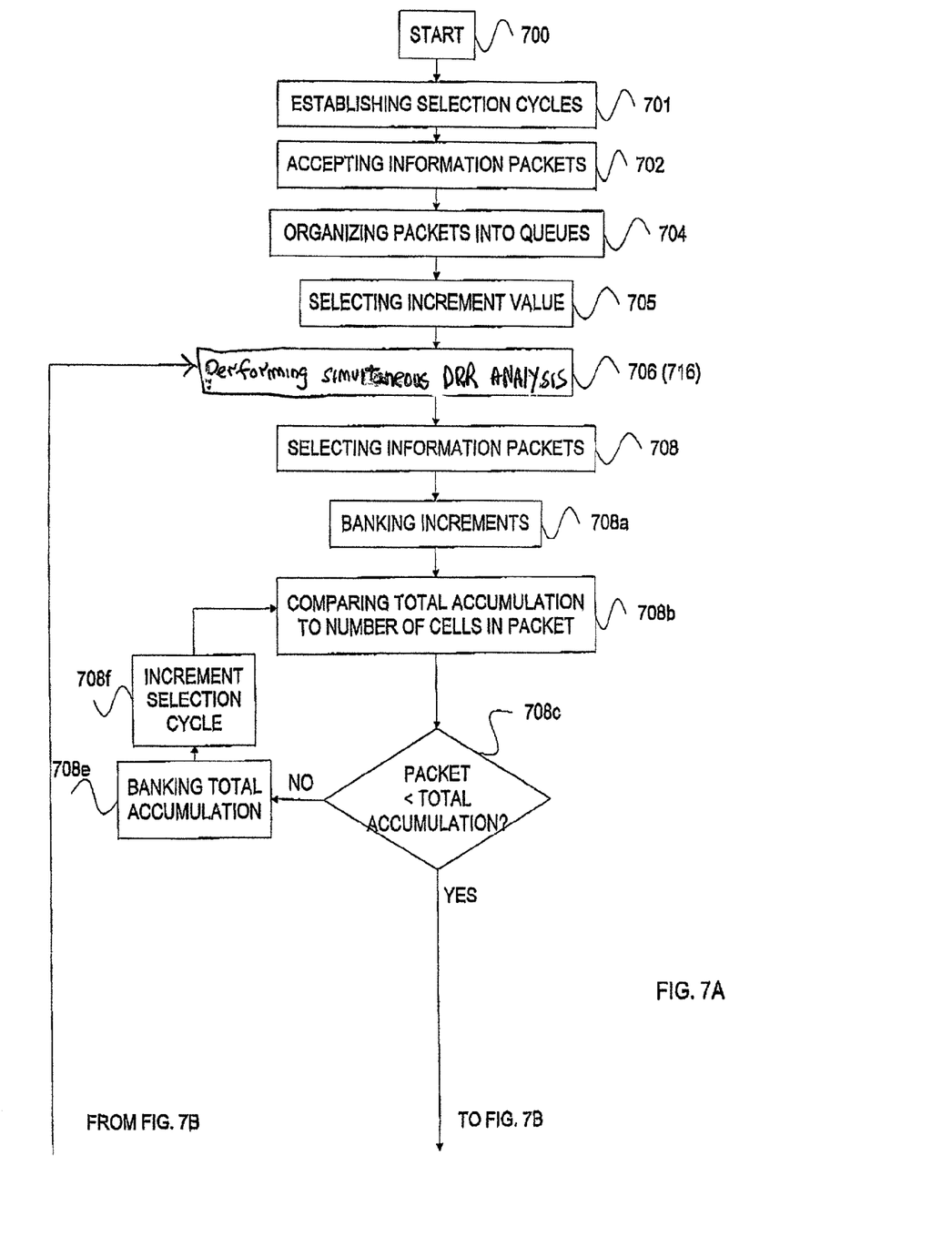
FIGS. 7a and 7b are a flowchart illustrating the present invention method for prioritizing information packets for transfer across a switch.
Figure 7B:
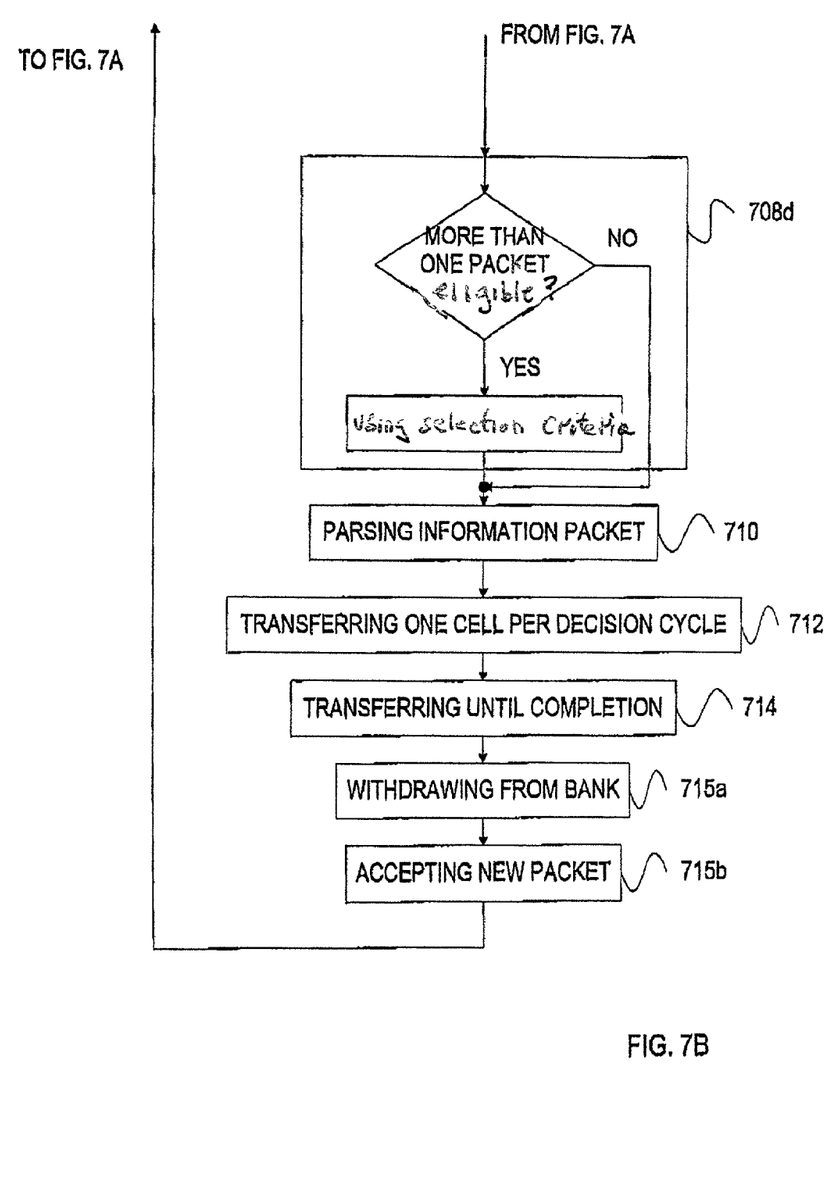

FIGS. 7a and 7b are a flowchart illustrating the present invention method for prioritizing information packets for transfer across a switch. Although the method is depicted as a sequence of numbered steps for clarity, no order should be inferred unless explicitly stated. The method starts at Step 700. Step 702, at each input, accepts a plurality of variable length information packets. Step 704 organizes the information packets into a plurality of queues. Step 706 simultaneously performs a DRR analysis of the information packets at the head of each queue. Step 708 selects an information packet for transfer in response to the simultaneous analysis. Step 710 parses the information packets into lengths of one cell. Step 712 transfers one cell from the selected information packet every decision cycle. Step 714 transfers one cell every decision cycle until no further cells remain in the selected information packet. Step 716, after completing the transfer of the cells of a selected information packet, simultaneously performs a DRR reanalysis of the information packets at the head of each COS queue.

In some aspects of the invention, accepting a plurality of information packets in Step 702 includes accepting information packets having a ranked class of service (COS). Then, organizing the information packets into a plurality of queues in Step 704 includes differentiating the queues by the COS of each information packet.

In some aspects of the invention, a further step, Step 701 establishes a plurality of selection cycles per decision cycle. Then, simultaneously performing a DRR analysis of the information packets at the head of each queue in Step 706 includes simultaneously analyzing information packets in each selection cycle. Further, simultaneously analyzing the information packets at the head of each queue in Step 706 includes analyzing information packets in response to the number of cells in each information packet.

In some aspects a further step, Step 705 selects an increment value for each of the plurality of COS queues, where each increment value corresponds to a selected number of cells. Typically, selecting an increment value for each of the plurality of COS queues includes selecting increment values with larger numbers of cells for higher ranking COS queues. Then, selecting an information packet for transfer in response to the simultaneous analysis in Step 708 includes comparing the number of cells in the information packet at the head of the queue to its corresponding increment value. More specifically, selecting an information packet for transfer in response to the simultaneous analysis in Step 708 includes comparing the number of cells in the information packet at the head of the queue to the corresponding total accumulation in a plurality of selection cycles.

In some aspects of the invention, selecting an information packet for transfer in Step 708 includes sub-steps. Step 708a establishes a bank for banking increment values, for each COS queue. Step 708b, for each selection cycle, compares the number of cells in the information packets at the head of each COS queue to a total accumulation that includes the increment value, plus the banked accumulation. Step 708c makes an information packet eligible for selection if it has a number of cells less than, or equal to the total accumulation. Step 708d picks the information packet in the queue having the highest COS, if information packets are eligible from a plurality of queues. Alternately, the least recent used or event succession methods, as described above, are used. Step 708e banks the total accumulation in each COS queue, if no information packets are picked. Step 708f goes to the next selection cycle.

In some aspects of the invention, accepting a plurality of information packets in Step 702 includes accepting information packets having a maximum number of cells. Selecting increment values in Step 705 includes selecting at least one increment value with a minimum number of cells. Simultaneously performing a DRR analysis of the information packets at the head of each queue in Step 706 includes simultaneously analyzing information packets in a maximum number of selection cycles every decision cycle. That is, the maximum number of selection cycles, times the minimum number of cells is greater than, or equal to, the maximum number of cells.

A further step, Step 715a, following the transfer of the selected information packet, subtracts the number of cells in the transferred information packet from the bank of the selected COS queue. Step 715b accepts a new information packet at the head of the selected COS queue, and Step 716 simultaneously performs a DRR reanalysis of the information packets at the head of each COS queue, including the new information packet.

A system and method are provided for prioritizing queued information packets for transfer across a switch. Examples have been presented for a single switch input, however, the invention is applicable to systems having multiple switch inputs. Likewise, the invention is applicable to parallel switch inputs where information packets are directed into a plurality of switch outputs. Further, the priority queuing process is not limited to the processing of information at merely the input to a switching system. The invention is useful in packet/cell switching, such as with synchronous optical network (SONET) or digital wrapper communications. However, the invention is also useful in other broadband communication switches. The invention can be embodied as a system of connected circuits, a system of connected integrated circuits (ICs), or potentially embedded in a single IC. Other variations and embodiments of the invention will occur to those skilled in the art.

We claim:

1. A method for prioritizing information packets for transfer across a switch, the method comprising:
   at each switch input, accepting a plurality of variable length information packets having a ranked class of service (COS);
   organizing the information packets into a plurality of queues differentiated by the COS of each information packet;
   simultaneously performing a deficit round robin (DRR) analysis of the information packets at the head of each queue;
   selecting an information packet for transfer in response to the simultaneous analysis;
   parsing the information packets into lengths of one cell;
   transferring one cell from the selected information packets every decision cycle;
   transferring one cell every decision cycle until no further cells remain in the selected information packet; and,
   after completing the transfer of the information packet cells, simultaneously performing a deficit round robin reanalysis of the information packets at the head of each queue.

2. A method for prioritizing information packets for transfer across a switch, the method comprising:
   at each switch input, accepting a plurality of variable length information packets having a ranked class of service (COS);
   organizing the information packets into a plurality of queues differentiated by the COS of each information packet;
   establishing a plurality of selection cycles per decision cycle;
   simultaneously performing a deficit round robin (DRR) analysis of the information packets at the head of each queue in a plurality of selection cycles per decision cycle;
   selecting an information packet for transfer in response to the simultaneous analysis;
   parsing the information packets into lengths of one cell;
   transferring one cell from the selected information packets every decision cycle;
   transferring one cell every decision cycle until no further cells remain in the selected information packet; and,
   after the information packet is transferred, simultaneously performing a deficit round robin reanalysis of the information packets at the head of each COS queue.

3. The method of claim 2 wherein simultaneously performing a deficit round robin analysis of the information packets at the head of each queue includes analyzing information packets in response to the number of cells in each information packet.

4. The method of claim 3 further comprising:
selecting an increment value for each of the plurality of queues, where each increment value corresponds to a selected number of cells; and,
wherein selecting an information packet for transfer in response to the simultaneous analysis includes comparing the number of cells in the information packet at the head of the queue to its corresponding increment value.

5. The method of claim 4 wherein selecting an increment value for each of the plurality of queues includes selecting increment values with larger numbers of cells for higher ranking COS queues.

6. The method of claim 4 wherein selecting an information packet for transfer in response to the simultaneous analysis includes comparing the number of cells in the information packet at the head of the queue to a corresponding total accumulation of increment values, accumulated in a plurality of selection cycles.

7. The method of claim 6 wherein selecting an information packet for transfer in response to the simultaneous analysis includes:
for each queue, establishing a bank for banking increment values;
for each selection cycle, comparing the number of cells in the information packets at the head of each queue to a total accumulation, where the total accumulation includes the increment value, plus previously banked increment values;
if the information packets have a number of cells less than, or equal to the total accumulation, making the information packet eligible for selection; and,
if information packets are eligible for selection from a plurality of queues, selecting the information packet in the queue using a selection criteria selected from the group including highest COS, least recently used, and event succession methods.

8. The method of claim 7 wherein selecting an information packet for transfer in response to the simultaneous analysis includes:
if no information packets are selected, banking the total accumulation for each queue; and,
going to the next selection cycle.

9. The method of claim 8 wherein accepting a plurality of information packets includes accepting information packets having a maximum number of cells;
wherein selecting increment values includes selecting a minimum increment value corresponding to a minimum number of cells; and,
wherein simultaneously performing a deficit round robin analysis of the information packets at the head of each queue includes simultaneously analyzing information packets in a maximum number of selection cycles every decision cycle, where the maximum number of selection cycles, times the minimum increment value is greater than, or equal to the maximum number of cells in an information packet.

10. The method of claim 9 further comprising:
following the transfer of the selected information packet, subtracting the number of cells in the transferred information packet from the bank of the queue from which the information packet was selected;
accepting a new information packet at the head of the queue from which the information packet was selected; and,
wherein simultaneously reanalyzing the information packets at the head of each queue includes analyzing the new information packet.

11. A switch system for prioritizing the transfer of information packets, the system comprising:
a queuing element having an input to accept a plurality of variable length information packets having a ranked class of service (COS), the queuing element having an output to supply the information packets organized into a plurality of queues differentiated by information packet COS;
an analyzer having a first input connected to the queuing element output, the analyzer simultaneously performing a deficit round robin (DRR) analysis of the information packets at the head of each queue, selecting an information packet for transfer in response to the simultaneous analysis of the queues, and supplying the selected information packet at an output;
a parser having an input connected to the output of the analyzer, the parser processing selected information packets in units of one cell, the parser having a second input to accept decision cycle timing signals and an output to transfer one cell from the selected information packet every decision cycle and to transfer one cell every decision cycle, until no further cells remain in the selected information packet;
wherein the parser completes the transfer of a selected information packet in a first decision cycle; and,
wherein the analyzer simultaneously performs a deficit round robin reanalysis of the information packets at the head of each COS queue in a second decision cycle, subsequent to the first decision cycle.

12. The system of claim 11 wherein the analyzer has a second input to receive a decision cycle signal including a plurality of selection cycles, the analyzer simultaneously performing the deficit round robin analysis of the information packets at the head of each queue in each selection cycle.

13. The system of claim 12 wherein the analyzer simultaneously performs a deficit round robin analysis of the information packets in response to the number of cells in each information packet.

14. A switch system for prioritizing the transfer of information packets, the system comprising:
a queuing element having an input to accept a plurality of variable length information packets having a ranked class of service (COS), the queuing element having an output to supply the information packets organized into a plurality of queues differentiated by information packet COS;
an analyzer having a first input connected to the queuing element output, a second input to receive a decision cycle signal including a plurality of selection cycles, and a third input to accept increment value selection commands for each of the plurality of queues, where each increment value corresponds to a selected number of cells, the analyzer simultaneously performing a deficit round robin (DRR) analysis of the information packets at the head of each queue in response to the number of cells in each information packet by comparing the number of cells in the information packet at the head of the queue to its corresponding increment value, selecting an information packet for transfer in response to the simultaneous analysis of the queues in a plurality of selection cycles per decision cycle, and supplying the selected information packet at an output; and, a parser having an input connected to the output of the analyzer, the parser processing selected information packets in units of one cell, the parser having a second input to accept decision cycle timing signal and an output to transfer one cell from the selected information packet every decision cycle, until no further cells remain in the selected information packet.

15. The system of claim 14 wherein the analyzer accepts commands selecting increment values with larger numbers of cells for higher ranking COS queues.

16. The system of claim 14 wherein the analyzer compares the number of cells in the information packet at the head of the queue to a corresponding total accumulation of increment values, accumulated in a plurality of selection cycles.

17. The system of claim 16 further comprising:
a bank having an input to accept and add increment values every selection cycle, to banked accumulations for each queue, the bank having an output to supply a total accumulation for each queue;
wherein the analyzer has a second output connected to the bank input to supply increment values, and a third input connected to the bank output to accept the total accumulation values; and,
wherein the analyzer compares the number of cells in the information packets at the head of each queue to the respective total accumulation for each queue.

18. The system of claim 17 wherein the analyzer makes information packets eligible for selection if the information packets have a number of cells less than, or equal to the total accumulation; and,
wherein the analyzer selects the information packet in the queue using a selection criteria selected from the group including highest COS, least recently used, and event succession methods, if information packets are eligible from a plurality of queues.

19. The system of claim 18 wherein the bank adds the increment value to the banked accumulation every selection cycle, for each queue that is not selected, and,
wherein the analyzer selects an information packet in a subsequent selection cycle by comparing the number of cells in the information packets at the head of each queue to the total accumulation for the corresponding queue.

20. The system of claim 19 wherein the queuing element accepts information packets having a maximum number of cells;
wherein the analyzer receives commands to select a minimum increment value corresponding to a minimum number of cells; and,
wherein the analyzer simultaneously performs a deficit round robin analysis of the information packets in a maximum number of selection cycles every decision cycle, so that the maximum number of selection cycles, times the minimum increment value is greater than, or equal to the maximum number of cells in an information packet.

21. The system of claim 20 wherein the bank, following the transfer of the selected information packet, accepts a withdrawal from the barked accumulation of the selected queue that equals the number of cells in the transferred information packet;
wherein the queuing element accepts a new information packet at the head of the selected queue; and,
wherein the analyzer simultaneously performs a deficit round robin reanalysis of the information packets at the head of each queue.

* * * * *